United States Patent [19]

Shettel

[11] 4,123,345
[45] Oct. 31, 1978

[54] LIQUID TREATING APPARATUS

[75] Inventor: Don L. Shettel, Bloomfield Hills, Mich.

[73] Assignee: AMSTED Industries Incorporated, Chicago, Ill.

[21] Appl. No.: 671,213

[22] Filed: Mar. 29, 1976

Related U.S. Application Data

[62] Division of Ser. No. 499,670, Aug. 22, 1974, Pat. No. 3,970,536.

[51] Int. Cl.$^2$ ............................ C02C 5/12; B03C 5/00
[52] U.S. Cl. .................................... 204/275; 204/149; 204/152; 204/299 R
[58] Field of Search .................. 204/149, 152, 180 R, 204/299, 300, 275; 210/44

[56] References Cited

U.S. PATENT DOCUMENTS

| | | | |
|---|---|---|---|
| 3,479,281 | 11/1969 | Kikindai et al. | 210/44 |
| 3,767,046 | 10/1973 | Hartkorn | 204/149 |
| 3,915,817 | 10/1975 | Bennett | 204/149 X |
| 3,944,478 | 3/1976 | Kuji et al. | 204/275 |

Primary Examiner—Arthur C. Prescott
Attorney, Agent, or Firm—Fred P. Kostka; Edward J. Brosius

[57] ABSTRACT

A filter method and apparatus removes tramp oils and fine particulate contaminants from an electrically conductive liquid coolant which is utilized in metal forming, or other comparable, operations. The disclosed method includes flowing the liquid coolant into a separation vessel having a plurality of alternating, oppositely charged plates. The tramp oils and particulate contaminants have an electrical surface charge and are therefore attracted toward one of the charged plates to effect a contaminant migration. This migration results in an agglomeration of the contaminants, but does not necessarily result in an accumulation of the contaminants on the attracting plate. The other charged plate is simultaneously generating a myriad of gaseous bubbles by electrolysis of the liquid coolant. The generated bubbles entrain at least a portion of the agglomerated contaminants into an upward flow to the liquid surface where those contaminants can be conventionally removed. Any contaminants which may accumulate on the attracting plate surface can be removed by simply reversing that plate's polarity. The agglomerated contaminants which are not removed by entrainment in the electrolytically produced bubbles can be removed by conventional filtration techniques due to the magnitude of the agglomerate size as compared to the original contaminant size.

2 Claims, 3 Drawing Figures

LIQUID TREATING APPARATUS

This is a division of application Ser. No. 499,670, filed Aug. 22, 1974, now U.S. Pat. No. 3,970,536.

BACKGROUND OF THE INVENTION

The present invention relates to a filtering method and apparatus for removing contaminants from coolants employed in metal forming operations.

Prior to the development of precision metal drawing and ironing techniques, beverage and food cans were made from three pieces of metal. That is, a cylinder was formed from sheet metal stock by joining two ends to form a side seam which was bonded by crimping, welding or soldering. The top and bottom of a can were formed independently and sealed into place.

Through the use of advanced drawing and ironing techniques the two-piece can was developed. This type can incorporates the sidewalls and a formed bottom in one piece, with the top being an independent sealing member. It is with the process of drawing and ironing that the instant invention concerns itself. More particularly, this specification describes a method and apparatus for treating liquid coolants used in drawing and ironing operations for the manufacture of metal cans. Of course, however, utility of the present invention is not limited to drawing and ironing operations, but is useful in any situation where the contaminants to be filtered are electrically charged and are too small for removal by ordinary filtering or settling techniques.

A two-piece can is manufactured by first stamping out the sidewall and bottom portion in a cup-like form from a sheet of metal. This metal sheet may be aluminum, tin-free steel, or tinplate. The second operation performed on the cup-like sidewall and bottom portion is called drawing and ironing. This operation forms the bottom of the can in a deep draw over a mandrel, with ironing ring tools making the deep draw possible by keeping the metal sidewall thickness uniform.

Shaping sheet metal material into the two-piece can by drawing and ironing causes friction between the mandrel tool and the metal cup, which may be reduced by using a liquid lubricant. This lubricant, commonly called a coolant also serves to dissipate heat from the working surface and the metal cup. The coolant serves one further purpose, that is to carry away any dirt particles, metal fines, metal oxides, or tramp oil or greases which find their way into the system.

There are two primary sources of liquid coolant contaminants. The first source is that of the metal itself which is being drawn and ironed. The surface of the metal sheet is coated with a very thin layer of metal oxides. As the metal is drawn and ironed these metal oxides along with pure metal fines flake off or are scraped off the stretched metal cup. These fines, which are near colloidal in size, are carried away from the machining operation by the liquid coolant. There are also present a certain amount of metal and carbides worn from tool surfaces.

The second major source of liquid coolant contaminants is that of tramp oils and greases which find their way into the liquid coolant as leakage from the stamping, drawing and ironing machines in the form of lubricating and hydraulic oils and greases.

These contaminants build up in the liquid coolant as it is recirculated repeatedly through the can forming system. Unless adequately treated, the concentration of contaminants will reach such a point that it will become necessary to dispose of the coolant and begin with a new batch.

It is suspected that a considerable part of the particulate contaminants as first generated are very fine. However, as these particulate contaminants are circulated again and again through the operating system they are probably ground finer and finer between the mandrel tools and metal working surfaces. The average diameter size of these particulate contaminants is on the order of 100 to 500 angstrom units. Because the particulate contaminants are so fine it is practically impossible to remove them from the coolant using present filtration or other treatment methods.

Thus the particulate contaminants are approaching a collidal size. Thousands of these particules will find their way into a single droplet of tramp oil suspended in the liquid coolant. The fineness of the particulate contaminants and the suspension of tramp oils creates a condition which in the past has defied ordinary techniques for treating and conditioning liquid coolants. A filter media which is tight enough to entrap the suspended contaminants surface loads and yields unreasonably short filtration cycles. Filter media which is open enough not to be affected by the surface loading characteristics of tramp oils does not exhibit any degree of effective particle removal. Standard settling, without chemical treatment, is practically ineffective since the suspended contaminants have a specific gravity very near that of the liquid coolant thus resulting in little or no clarification from settling techniques. Chemical treatment destroys the liquid coolant and is thus out of the question.

SUMMARY OF THE INVENTION

Before getting into the detailed description of the instant invention, a review of some of the pertinent prior art is in order. The use of electrically charged plates for clarifying fluids has long been known. The most outstanding application is that of electrostatic precipitators for removing fine particulate suspensions from air. Less well known is the use of charged plates for clarifying dielectric liquids. The least complicated example of this is found in U.S. Pat. No. 2,542,054. Further examples are shown in U.S. Pat. Nos. 3,247,091 and 3,616,460 and British Pat. Nos. 478,230 and 513,631. Some devices use a filter medium situated between the charged surfaces. Examples of these types are shown in U.S. Pat. No. 3,484,362 and U.S. Pat. No. 3,489,669.

In all of these devices, treatment of the liquid relies entirely upon the phenomenon known as electrophoresis. That is simply the migration of a suspended charged particle toward a surface bearing an opposite charge from that of the particle.

The present invention provides a method and apparatus for effectively treating liquid coolants, typically water-based soluble oil coolants, used in metal drawing and ironing operations by passing the contaminated liquid coolant between electrically charged surfaces of opposite polarity. The detention time between the charged surfaces should be sufficient to permit a material portion of the suspended contaminants to migrate toward, but not necessarily come in contact with, the surface which carries a charge opposite from the electrical charge characteristics of the suspended contaminants. This migration enhances the agglomeration of suspended contaminants.

Concurrently with the agglomeration and migration, there occurs an electrolysis of the liquid coolant. At the charged surface opposite from that attracting the particles there is formed very minute bubbles of gas which rise up through the liquid coolant. As the bubbles rise through the liquid coolant it is believed that they attach themselves to the suspended contaminants and float the contaminants to the surface of the liquid. These floating contaminants are then skimmed from the surface and collected for disposal or further treatment.

The gas so formed has been shown to be hydrogen. Oxygen is obviously being formed at the other surface but apparently does not appear in a gaseous state. It is believed that the oxygen so formed dissolves in the liquid or combines with available metals and other materials to form oxides.

A certain quantity of the suspended contaminants find their way to the attracting surface where they accumulate. These contaminants are removed from the surface by mechanical means or by reversing the polarity on the charged surfaces. These contaminants, in the form of a sludge, float readily to the surface when removed from the charged surface. Thus floating on the surface they are readily skimmed and collected for disposal or further treatment.

The liquid coolant so treated responds to the standard filtration techniques. After treatment by passing between electrically charged surfaces and skimming, the coolant is subjected to filtration for the final stage of treatment. The liquid coolant is then transferred back to the can forming machines, or other similar machines, to carry out its function as a lubricant and cooling agent.

BRIEF DESCRIPTION OF THE DRAWINGS

FIG. 3 is an elevation cross-sectional view along plane 3—3 of FIG. 2.

DETAILED DESCRIPTION OF THE INVENTION

Figure 1:
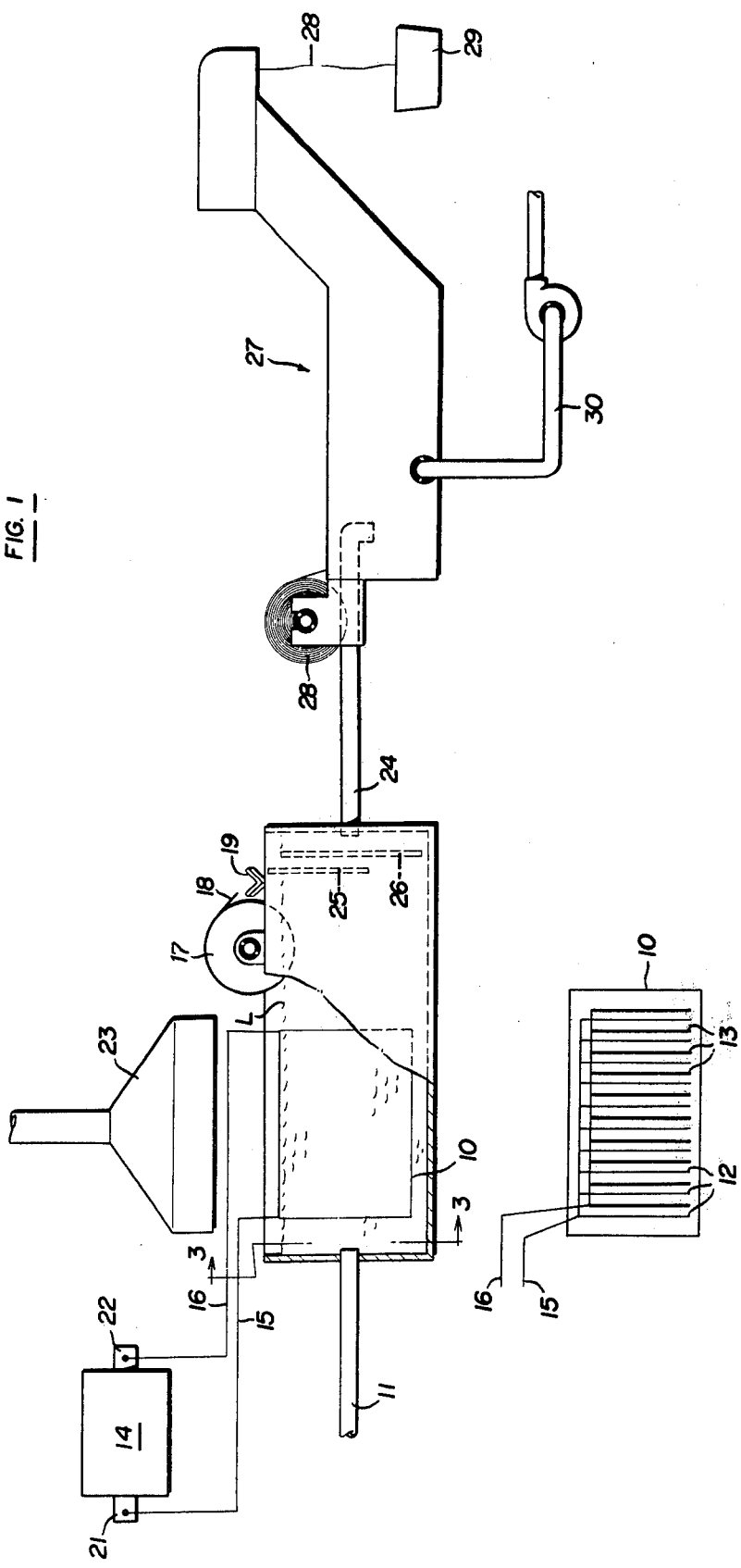
FIG. 1 depicts a side elevational view of a schematic representation of a preferred embodiment of the present invention.

As illustrated in the drawings, contaminated liquid coolant from a machine operation enters a tank 10 through line 11 and passes between a plurality of immersed plates 12 and 13. The level of liquid coolant in tank 10 is preferably maintained as shown at line L. It is while the contaminated coolant is passing between the plates 12 and 13 that the treatment critical to the present invention takes place.

Figure 2:
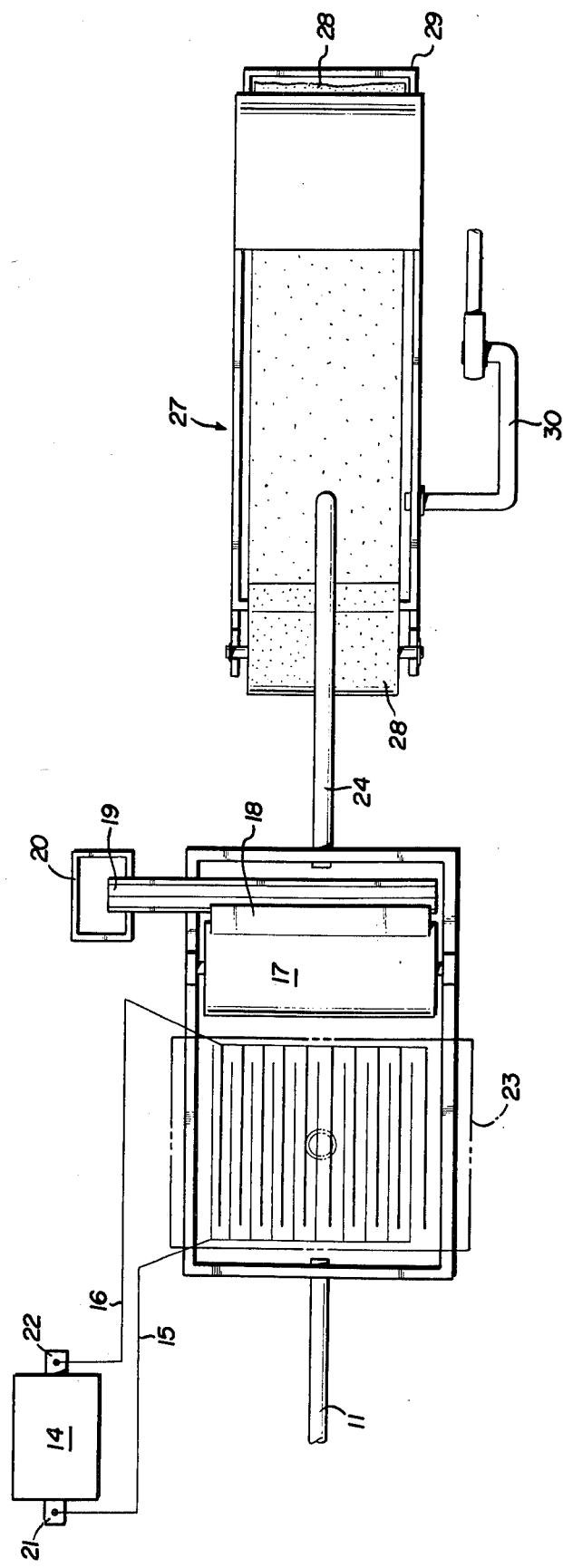
FIG. 2 is a top plan view of the schematic representation shown in FIG. 1.

The plates 12 and 13 are preferably vertically arranged and are electrically charged by direct current from an electrical power source 14. It can be seen from FIGS. 2 and 3 that plates 12 and 13 are alternately arranged. These plates may be mounted in tank 10 in any conventional manner.

Plates 12 and 13 may be comprised of any electrically conductive material which can form a surface charge and in preferred embodiment are comprised of stainless steel. It is preferred but not required that surfaces 12 be plates; most any type of surface would be adequate, including perforated, corrugated, or mesh surfaces. Further, it is not necessary that surfaces 12 be identical to surfaces 13. For example, in preferred embodiment surfaces 12 may be defined by plates while surfaces 13 are defined by screens.

Plates 12, as illustrated, are the anodes and receive their positive charge from a terminal 21 of the power source 14 by means of an electrical conducting line 15. Plates (or screens) 13 are the cathodes and carry a negative charged by means of an electrical conducting line 16 running from a terminal 22 of the power source 14.

An electrophoretic action takes place between the plurality of charged plates 12 and 13 of the instant invention. The suspended contaminants which are comprised of tramp oils and metal fines or metal oxide fines have exhibited a predominantly negative surface charge. These contaminants thus migrate toward anode plates 12 under the influence of the positive surface charge on those plates.

This migration of suspended contaminants toward plates 12 is a clear example of electrophoresis. To that extent it is similar to the prior art. However, unlike all prior art examples, the liquid coolant being treated is not a dielectric material but is rather a highly conductive material. The liquid coolant is formed from a water base and contains along with the chemical additives of the coolant a sufficient quantity of ions to make it electrically conductive. In all discussions of the prior art, it is recognized that electrophoresis operates efficiently only in a dielectric medium such as air or oil or kerosene or gasoline. A dielectric medium is necessary for the maintenance of a very high potential between the charged surfaces while keeping the electrical current flow and thus the use of electrical energy to a minimum.

The present invention utilizes a unique and unexpected phenomenon involving the combined effect of electrophoresis and electrolysis in an electrically conductive liquid. Though there is an agglomeration of suspended contaminants resulting from the migration of these contaminants toward the positively charged plates 12, it has been observed that there is generated an appreciable quantity of hydrogen gas from the electrolysis of the liquid coolant, e.g. water-based coolant, at the plates 13. The hydrogen gas forms on cathode plates 13 in the form of very fine bubbles approaching molecular size. These bubbles of gas are released from the plate 13 and rise through the contaminated liquid retained in tank 10. As the bubbles rise through the liquid, it is believed that they increase in size and attach themselves to the suspended contaminants and float these contaminants to the surface of the liquid. As the suspended solids reach the surface they form a very thick sludge which must be scraped or skimmed from the surface for further treatment or disposal.

What is being effected is best described as a kind of super fine flotation. The bubbles of rising gas begin to form at an atomic or molecular size. This is much finer than standard air entraining or dissolved air flotation methods. It is well recognized that the finer the bubble the more efficient the flotation.

Not all of the contaminants rise to the surface of the liquid through this flotation action. A certain quantity of the contaminants reach plates 12 as a result of migration. The contaminants adhere to the plates in the form of a sludge and can be removed mechanically by scraping or vibration or by reversing the polarity on plates 12 and 13. When the sludge is removed from the plates 12, it floats readily to the surface of the contaminated liquid and can be removed by ordinary skimming techniques.

There is a certain amount of suspended contaminants which are neither floated to the surface by gas bubbles nor adhere to plates 12. Though these contaminants pass through tank 10, they are affected by the action occurring between plates 12 and 13. There is a degree of agglomeration among even these contaminants which aids in the removal of these contaminants through subsequent filtration.

It is the combined effect of electrophoresis and electrolysis which synergistically yields the highly desireable treatment achieved by the present invention. Because of the conductivity of the liquid coolant, the amount of energy required to obtain sufficient clarity under the action of electrophoresis alone would be prohibitively uneconomical. On the other hand, electrolysis without agglomerating effect of electrophoresis would not yield the efficiency in terms of time detention that is exhibited when the two phenomena are combined. The larger particles of contaminants resulting from electrophorectic migration are a better target for the gas bubbles and are thus buoyed more easily.

Addressing ourselves again to the flow diagram as shown in the drawings, as the contaminated liquid passes between the plurality of plates 12 and 13 the suspended contaminants in the form of a sludge rise to the surface of the liquid and are skimmed off by drum skimmer 17. These contaminants are then removed from the skimmer by doctor blade 18 and flow trough 19 into tank 20 for later disposal or treatment. Because those skilled in the art are familiar with drum skimmers, no detailed explanation of its construction or operation will be given. It should be recognized that other skimming devices can also be used, including belt skimmers, flight skimmers and decant skimmers.

The sludge which adheres to plates 12 can be removed by mechanical scrapers or vibrators, not shown. Also by switching line 16 to terminal connection 21 and line 15 to terminal connection 22 the polarity of plates 12 and 13 would be reversed and any adhering sludge would be removed from plates 12. The sludge thus removed floats to the surface of the contaminated liquid and is skimmed off by skimmer 17.

The hydrogen gas which is formed at cathode plate 13, being explosive, must be captured in a hood 23 and properly vented.

As the contaminated liquid passes from between the plates 12 and 13 it moves toward an outlet line 24 under the pressure of the liquid accumulated in tank 10. Alternatively, a pump may be employed in line 24 to effect liquid flow therethrough. Baffle plates 25 and 26 are provided in tank 10 to prevent short circuiting flow of the contaminated liquid. The partially treated contaminated liquid then passes into filter device 27. The operation of this type filter is described in detail in U.S. Pat. No. 2,087,620 and U.S. Pat. No. 3,091,336 incorporated herein by reference. Other filters which are also suitable for use with the present invention include those described in U.S. Pat. Nos. 2,867,324 and 2,867,325 also incorporated herein by reference.

The suspended contaminants which were not removed by flotation to the surface in tank 10 and which were affected by agglomeration between plates 12 and 13 can be effectively removed by filtering action through filter medium 28. The filter medium is disposed of along with captured suspended contaminants in bin 29. The fully treated liquid coolant is pumped from filtering device 27 through line 30 and returned to the process machinery for use as a lubricant and cooling agent. After the processed liquid has been employed in its lubricant and coolant capacity, where it accumulates the super fine contaminants envisioned by the present invention, the liquid is then returned to the present filter assembly for further treatment.

It is to be understood that the foregoing description has been merely exemplary of the present invention rather than limiting. Further, the present invention is intended to cover all equivalents which would be apparent to one skilled in the art.

Having fully and completely disclosed my invention, I now claim:

1. An apparatus for gravitationally segregating a fluid from contaminants suspended therein, comprising:
   a vessel; delivery means for continuously flowing said fluid with suspended contaminants into said vessel; means for removing contaminants from the surface of said fluid; and discharge means for continuously flowing said fluid from said vessel after treatment;
   the improvements comprising a first electrically charged means in said vessel and immersed within said fluid, and
   a second electrically charged means in said vessel and immersed in spaced relation to said first charged means within said fluid,
   a substantially constant DC power source for establishing a substantially constant positive electrical charge on said first electrically charged means and an identical, substantially constant negative electrical charge on said second electrically charged means,
   said first charged means and said second charged means each comprising a plurality of pairs of generally planar, vertical and parallel electrodes arranged to provide a series of oppositely charged conductors in alternating, side-by-side relationship, said electrodes comprised of a material substantially electrochemically inert with respect to said fluid,
   said first charged means electrodes and said second charged means electrodes arranged such that the continuous horizontal flow of said fluid through said vessel is generally parallel to said electrodes, said delivery means and said discharge means so arranged on said vessel as to regulate the flow of said fluid through said vessel such that an electrophoretic attraction of said suspended contaminants toward said first charged means electrodes occurs with resulting agglomeration of said suspended contaminants between said first and second charged means electrodes, said second charged means electrodes electrolytically generating hydrogen bubbles that attach to the agglomerated contaminants and float the contaminants to the surface of the fluid within said vessel.

2. The apparatus as defined in claim 1, characterized by said first and second means being comprised of stainless steel electrodes.

* * * * *